United States Patent
Hicks et al.

(10) Patent No.: US 9,632,594 B2
(45) Date of Patent: Apr. 25, 2017

(54) STYLUS SENSITIVE DEVICE WITH STYLUS IDLE FUNCTIONALITY

(71) Applicant: Barnes & Noble College Booksellers, LLC, Basking Ridge, NJ (US)

(72) Inventors: Kourtny M. Hicks, Sunnyvale, CA (US); Gerald B. Cueto, San Jose, CA (US)

(73) Assignee: Barnes & Noble College Booksellers, LLC, Basking Ridge, NJ (US)

( * ) Notice: Subject to any disclaimer, the term of this patent is extended or adjusted under 35 U.S.C. 154(b) by 311 days.

(21) Appl. No.: 13/793,277

(22) Filed: Mar. 11, 2013

(65) Prior Publication Data

US 2014/0253464 A1    Sep. 11, 2014

(51) Int. Cl.
*G06F 3/038* (2013.01)
*G06F 3/0354* (2013.01)
*G06F 3/0488* (2013.01)

(52) U.S. Cl.
CPC .......... *G06F 3/03545* (2013.01); *G06F 3/038* (2013.01); *G06F 3/0488* (2013.01)

(58) Field of Classification Search
CPC ..... G06F 3/03545; G06F 3/0488; G06F 3/038
USPC ............... 345/173–184; 178/18.01–20.04
See application file for complete search history.

(56) References Cited

U.S. PATENT DOCUMENTS

| | | | |
|---|---|---|---|
| 4,896,543 A | 1/1990 | Gullman | |
| 5,045,843 A * | 9/1991 | Hansen | G06F 3/0304 345/158 |
| 5,633,471 A | 5/1997 | Fukushima | |
| 5,844,557 A | 12/1998 | Shively, II | |
| 6,259,438 B1 | 7/2001 | Fleck et al. | |
| 6,577,299 B1 * | 6/2003 | Schiller | G06F 3/0325 345/158 |

(Continued)

FOREIGN PATENT DOCUMENTS

EP    0722150 A1    7/1996

OTHER PUBLICATIONS

"Adonit Jot Touch (for iPad)," Adonit Jot Touch (for iPad) Review & Rating—PCMag.com; http://www.pcmag.com/article2/0,2817,2411192,00.asp; 6pages, printed from the Internet on Jun. 20, 2013.

(Continued)

*Primary Examiner* — Kumar Patel
*Assistant Examiner* — Vinh Lam
(74) *Attorney, Agent, or Firm* — Finch & Maloney PLLC

(57) ABSTRACT

Techniques are disclosed for performing functions in electronic devices by placing a device stylus in an idle position. The function may be, for example, activating a device idle mode, activating power saver or power-down mode, activating sleep mode, activating a screensaver, and/or locking the device. In some embodiments, an idle position may include setting the stylus in a horizontal position next to but not touching the device, setting the stylus in a stationary position relative to the computing device, or latching the stylus to the device or to a protective device case. In some embodiments, the stylus and/or device can detect the stylus' angle of inclination with respect to the device, thus detecting the nature of the stylus' resting. In other embodiments, when a magnetic stylus is latched to the device or device case, a magnetic sensor within the device may detect the stylus, thus activating a stylus idle mode.

18 Claims, 9 Drawing Sheets

(56) References Cited

U.S. PATENT DOCUMENTS

| | | | |
|---|---|---|---|
| 6,683,601 B2* | 1/2004 | Okamoto | G06F 1/1626 178/18.01 |
| 6,956,564 B1 | 10/2005 | Williams | |
| 7,145,555 B2* | 12/2006 | Taylor | G06F 3/0346 178/18.01 |
| 7,283,127 B2* | 10/2007 | Taylor | G06F 3/0346 178/18.01 |
| 7,649,524 B2 | 1/2010 | Haim et al. | |
| 7,840,912 B2 | 11/2010 | Elias et al. | |
| 7,897,885 B2* | 3/2011 | Tsai | G06F 3/03545 178/19.01 |
| 7,898,541 B2 | 3/2011 | Hong et al. | |
| RE42,738 E | 9/2011 | Williams | |
| 8,059,101 B2 | 11/2011 | Westerman et al. | |
| 8,239,413 B2 | 8/2012 | Hubert | |
| 8,274,536 B2 | 9/2012 | Chaudhri et al. | |
| 8,286,104 B1 | 10/2012 | Yonge-Mallo | |
| D670,713 S | 11/2012 | Cranfill et al. | |
| RE44,103 E | 3/2013 | Williams | |
| 8,400,417 B2 | 3/2013 | Ording et al. | |
| 8,508,494 B2 | 8/2013 | Moore | |
| 8,994,657 B2* | 3/2015 | Liberty | A61B 5/1101 178/18.01 |
| 2001/0025289 A1 | 9/2001 | Jenkins et al. | |
| 2002/0047834 A1* | 4/2002 | Okamoto | G06F 1/1626 345/179 |
| 2002/0116421 A1 | 8/2002 | Fox et al. | |
| 2002/0134594 A1* | 9/2002 | Taylor | G06F 3/0346 178/18.01 |
| 2002/0190823 A1* | 12/2002 | Yap | G06F 1/1616 335/205 |
| 2003/0095115 A1* | 5/2003 | Brian | G06F 3/0346 345/179 |
| 2004/0239652 A1* | 12/2004 | Taylor | G06F 3/0346 345/179 |
| 2004/0252110 A1* | 12/2004 | Defuans | G06F 1/1626 345/179 |
| 2006/0284854 A1* | 12/2006 | Cheng | G06F 3/03545 345/173 |
| 2007/0047002 A1 | 3/2007 | Hull et al. | |
| 2007/0070053 A1* | 3/2007 | Lapstun | B43K 7/005 345/179 |
| 2008/0036747 A1 | 2/2008 | Hope | |
| 2008/0225018 A1* | 9/2008 | Pang | G06F 1/1626 345/179 |
| 2008/0231613 A1* | 9/2008 | Tsai | G06F 3/03545 345/179 |
| 2009/0000831 A1* | 1/2009 | Miller | G06F 3/03545 178/19.01 |
| 2010/0084202 A1* | 4/2010 | Selin | G06F 3/03545 178/19.01 |
| 2010/0100854 A1 | 4/2010 | Russell et al. | |
| 2010/0192086 A1 | 7/2010 | Kocienda et al. | |
| 2010/0229130 A1 | 9/2010 | Edge et al. | |
| 2010/0259482 A1 | 10/2010 | Ball | |
| 2010/0262659 A1 | 10/2010 | Christiansen et al. | |
| 2010/0277327 A1* | 11/2010 | Lee | G06F 1/30 340/636.16 |
| 2010/0318895 A1 | 12/2010 | Steinberger et al. | |
| 2011/0012849 A1* | 1/2011 | Cho | G06F 1/1626 345/173 |
| 2011/0084951 A1* | 4/2011 | Karhuketo | G06F 1/3203 345/211 |
| 2011/0115741 A1* | 5/2011 | Lukas | G06F 21/32 345/174 |
| 2011/0163972 A1* | 7/2011 | Anzures | G06F 3/04886 345/173 |
| 2011/0258542 A1 | 10/2011 | Kenney et al. | |
| 2012/0032909 A1* | 2/2012 | Wang | G06F 3/0416 345/174 |
| 2012/0056821 A1 | 3/2012 | Goh | |
| 2012/0127110 A1 | 5/2012 | Amm et al. | |
| 2012/0139879 A1 | 6/2012 | Kim et al. | |
| 2012/0221938 A1 | 8/2012 | Patterson et al. | |
| 2012/0235901 A1 | 9/2012 | Binder | |
| 2012/0242579 A1 | 9/2012 | Chua | |
| 2012/0242584 A1 | 9/2012 | Tuli | |
| 2012/0249768 A1 | 10/2012 | Binder | |
| 2012/0280947 A1 | 11/2012 | Weaver et al. | |
| 2012/0311438 A1 | 12/2012 | Cranfill et al. | |
| 2012/0329529 A1 | 12/2012 | van der Raadt | |
| 2013/0016045 A1 | 1/2013 | Zhao et al. | |
| 2013/0036383 A1 | 2/2013 | Yuan et al. | |
| 2013/0044083 A1* | 2/2013 | Basnett | G06F 1/325 345/179 |
| 2013/0063364 A1 | 3/2013 | Moore | |
| 2013/0063366 A1* | 3/2013 | Paul | G06F 3/0416 345/173 |
| 2013/0076632 A1 | 3/2013 | Sirpal et al. | |
| 2013/0076637 A1 | 3/2013 | Teltz | |
| 2013/0076638 A1 | 3/2013 | Sirpal et al. | |
| 2013/0076781 A1 | 3/2013 | Sirpal et al. | |
| 2013/0082937 A1* | 4/2013 | Liu | G06F 1/3262 345/173 |
| 2013/0082976 A1* | 4/2013 | Kang | G06F 3/0418 345/174 |
| 2013/0106714 A1* | 5/2013 | Shahparnia | G06F 1/3203 345/173 |
| 2013/0106723 A1* | 5/2013 | Bakken | G06F 3/03545 345/173 |
| 2013/0106782 A1* | 5/2013 | Nowatzyk | G06F 3/03545 345/175 |
| 2013/0113699 A1 | 5/2013 | Lim | |
| 2013/0113762 A1* | 5/2013 | Geaghan | G06F 3/044 345/179 |
| 2013/0120271 A1 | 5/2013 | Lee et al. | |
| 2013/0135234 A1 | 5/2013 | Hisano et al. | |
| 2013/0139078 A1 | 5/2013 | Chuang et al. | |
| 2013/0139107 A1 | 5/2013 | Jung | |
| 2013/0162532 A1 | 6/2013 | Cheng et al. | |
| 2013/0162589 A1* | 6/2013 | Lien | G06F 3/046 345/174 |
| 2013/0185680 A1 | 7/2013 | Chaudhri et al. | |
| 2013/0194308 A1 | 8/2013 | Privault et al. | |
| 2013/0321360 A1* | 12/2013 | Huang | G01B 3/06 345/179 |
| 2014/0028577 A1* | 1/2014 | Krah | G06F 3/0416 345/173 |
| 2014/0085269 A1* | 3/2014 | Armstrong-Muntner | G06F 3/03545 345/179 |
| 2014/0104224 A1* | 4/2014 | Ih | G06F 3/044 345/174 |

OTHER PUBLICATIONS

Volpe, Joseph, Amazon patents intelligent pen for adding annotations to digital and printed media (updated), posted Mar. 6, 2012 at 5:39PM, http://www.engadget.com/2012/03/06/amazon-patents-intelligent-pen/, 3 pages, printed from the Internet on Jun. 20, 2013.

"Apple Secretly Filed Three Dynamic Smart Pen Patents in Europe that are Chock Full of Cool Ideas," http://www.patentlyapple.com/patently-apple/2013/02/apple-secretly-filed-three-dynamic-smart-pen-patents-in-europe-that-are-chock-full-of-cool-ideas.html, originally published Feb. 28, 2013, 13 pages, printed from the Internet on Aug. 13, 2013.

"Bamboo Stylus," Wacom Americas, http://www.wacom.com/en/products/stylus, 5 pages, printed from the Internet on Jun. 20, 2013.

Robertson, Adi, "Blue Tiger pressure-sensitive iOS stylus will work over Bluetooth 4.0," http://www.theverge.com/2012/3/7/2851562/blue-tiger-ten-one-design-pressure-sensitive-bluetooth-4-0-stylus, 1 page, printed from the Internet on Aug. 2, 2013.

Malacria, et al., "Clutch-Free Panning and Integrated Pan-Zoom Control on Touch-Sensitive Surfaces: The CycloStar Approach," CHI 2010, Apr. 10-15, 2010, Atlanta, Georgia, USA. Copyright 2010 ACM 978-1-60558-929-9, 10 pages, Sep. 10, 2004.

"Pen," DuoSense Pen, N-trig Hands-on computing, http://www.n-trig.com/Content.aspx?Page=DigitalPencil, 3 pages, printed from the Internet on Jun. 20, 2013.

(56) References Cited

OTHER PUBLICATIONS

"Easing functions," Easing Functions Cheat Sheet, http://easings.net/, 3 pages, printed from the Internet on Jun. 17, 2013.
Kirupa, Easing Functions (aka Timing Functions) in CSS3, printed Apr. 3, 2013, kirupa.com, http://www.kirupa.com/html5/easing_functions_css3.htm, 16 pages, printed from the Internet on Jun. 18, 2013.
"EMR (Electro-Magnetic Resonance) Technology—The De Facto Standard for Pen Tablet Devices is Realized using EMR Technology," Wacom Components : Input Technology : EMR Technology, http://wacom-components.com/english/technology/emr.html, 5 pages, printed from the Internet on Aug. 2, 2013.
"Simultaneous Pen & Touch: The Natural Way to Work," Perceptive Pixel Active Stylus, www.perceptivepixel.com/_literature_136086/Active_Stylus, 2 pages, printed from the Internet on Dec. 14, 2012.
"Future Apple Notebooks & Tablets may use Acoustic Commands—Patently Apple," originally published Feb. 18, 2011, http://www.patentlyapple.com/patently-apple/2011/02/future-apple-notebooks-tablets-may,6 pages, printed from the Internet on Nov. 3, 2012.
"Guidelines for selecting text and images (Windows Store apps)," http://msdn.microsoft.com/en-us/library/windows/apps/hh465334, 5 pages, printed from the Internet on Jun. 20, 2013.
Lutz, Zachary, "Hands-on with wireless, ultrasonic stylus an touchless gestures at MWC (video)," posted Mar 1, 2012 at 8:28 AM, http://www.engadget.com/2012/03/01/hands-on-with-wireless-ultrasonic-stylus-and-touchl, 3 pages, printed from the Internet on Jun. 20, 2013.
"HEX3 JaJa Pressure Sensitive Stylus," HEX3 JaJa Pressure Sensitive Stylus Review & Rating—PCMag.com, http://www.pcmag.com/article2/0,2817,2411194,00.asp, 6 pages, printed from the Internet on Jun. 20, 2013.
"How do WACOM tablets work?," tablet4u.co.uk, http://www.tablet4u.co.uk/techinfo.html, 2 pages, printed from the Internet on Jun. 20, 2013.
Kim, Arnold, "Multi-Touch Page Flipping eBook Concept Shown on an iPad," posted Jan. 22, 2012 at 10:52pm PST, MacRumors—news and rumors you care about, http://www.macrumors.com/2012/01/23/multi-touch-page-flipping-ebook-concept-shown-6 pages, printed from the Internet on Nov. 3, 2012.
"Desktop Touchscreens,"—Desktop touchscreens explained, http://www.touchscreenmagazine.nl/touchscreen-solutions/desktop-touchscreens, 1 page, printed from the Internet on Nov. 3, 2012.
"MTStylus Wireless Stereo Stylus for iPhone/Andriod Phone & Tablet," dexim-MTStylus Wireless Stereo Stylus, http://www.dexim.net/content.php?id=165&pid=11, 2 pages, printed from the Internet on Jun. 20, 2013.
"Padblue 2,"BRANDO—mobile.brando.com, http://mobile.brando.com/Padblue-2_p9162c1577d94.html., 4 pages, printed from the Internet on May 10, 2013.
Fingas, Jon, "Panasonic mobile devices to use Anoto's pattern-based pen input technology," posted Jan. 8th, 2013 at 1:00PM, http://www.engadget.com/2013/01/08/panasonic-mobile-devices-to-use-anoto-pattern-pen-, 4 pages, printed from the Internet on Jun. 20, 2013.
"Bluetooth 4.0 SmartPen the future just got a little brighter," Pogo Connect, http://tenonedesign.com/connect.php, 7 pages, printed from the Internet on Jun. 20, 2013.
Quick, Darren, "Pressure sensitive technology set to bring 3D capability to touchscreens," posted on Jan. 31, 2010, Mobile Technology, http://www.gizmag.com/new-touchscreen-technology, 4 pages, printed from the Internet on Aug. 2, 2013.
Rigg, Jamie, "Sony tries to patent stylus with friction-based haptic feedback," posted on Nov. 22, 2012 at 9:50 AM, http://www.engadget.com/2012/11/22/sony-haptic-feedback-stylus-patent/, 2 pages, printed from the Internet on Jun. 20, 2013.
"Stylus Hanging Bluetooth Headset," BRANDO—mobile.brando.com, http://mobile.brando.com/prod_detail.php?prod_id=03291, 4 pages, printed from the Internet on May 10, 2013.
"The JukeStyle is a great budget stylus for your iOS devices," stylus Archives—iPad News, http://www.ipadnews.nl/tag/stylus/, 44 pages, printed from the Internet on Jun. 20, 2013.
Lavrinc, Damon, "Why Flipping Through Paper-Like Pages Endures in the Digital World," originally posted on May 11, 2012 at 3:48PM, Gadget Lab, http://www.wired.com/gadgetlab/2012/05/why-flipping-through-paper-like-pages-endures-in-the-digital-world/, 5 pages, printed from the Internet on May 6, 2013.
Bragdon, et al., "Experimental Analysis of Touch-Screen Gesture Designs in Mobile Environments", Proceedings of the SIGCHI Conference on Human Factors in Computing Systems, pp. 403-412 (2011).
"Gesture Search for Google Mobile", Google Mobile, www.google.com/mobile/gesture-search, 1 page, printed from the Internet on Dec. 26, 2012.
"Comics by comiXology," Comic Book Reader Guide, http://www.comicbookreaderguide.com/comics-by-comixology/, 24 pages, printed from the Internet on May 6, 2013.
"NFC Forum: Frequently Asked Questions," http://www.nfc-forum.org/resources/faqs#acknowledge, 11 pages, printed from the Internet on Feb. 18, 2013.
"How to Remote Wipe an iPhone or iPad," OSXDaily, http://osxdaily.com/2012/06/05/remote-wipe-iphone-or-ipad/, 4 pages, printed from the Internet on Feb. 2, 2013.
"Screen hotspot," Wikipedia, the free encyclopedia, http://en.wikipedia.org/wiki/Screen_hotspot, 1 page, printed from the Internet on May 15, 2013.
"PAiA-Touch Switches," PAiA Corporation USA, file:///S:/Client%20Files/Barnes%20&%20Noble/IDS%20Master%20Folder/S&G%20-%2 . . . , 3 pages, printed from the Internet on Aug. 27, 2013.
Kanai, et al., "Intra-Rendition Navigation," Copyright 2012-2013 International Digital Publishing Forum (IDPF), 13 pages.
"Explaining how the sPen tech works (and is very diff than other styluses)," http://forum.xda-developers.com/showthread_php?t=," 1 page, printed from the Internet on Jan. 15, 2013.

* cited by examiner

STYLUS SENSITIVE DEVICE WITH STYLUS IDLE FUNCTIONALITY

FIELD OF THE DISCLOSURE

This disclosure relates to electronic display devices, and more particularly, to user interface techniques for interacting with stylus sensitive computing devices.

BACKGROUND

Electronic display devices such as tablets, eReaders, mobile phones, smart phones, personal digital assistants (PDAs), and other such stylus sensitive electronic display devices are commonly used for displaying consumable content. The content may be, for example, an eBook, an online article or blog, images, documents, a movie or video, just to name a few types. Such display devices are also useful for displaying a user interface that allows a user to interact with files or other content on the device. The user interface may include, for example, one or more screen controls and/or one or more displayed labels that correspond to nearby hardware buttons. The user may interact with the touch/stylus sensitive device using fingers, a stylus, or other implement. The display may be backlit or not, and may be implemented for instance with an LCD screen or an electrophoretic display. Such devices may also include other contact sensitive surfaces, such as a track pad (e.g., capacitive or resistive sensor) or contact sensitive housing (e.g., acoustic sensor).

DETAILED DESCRIPTION

Figure 1A:
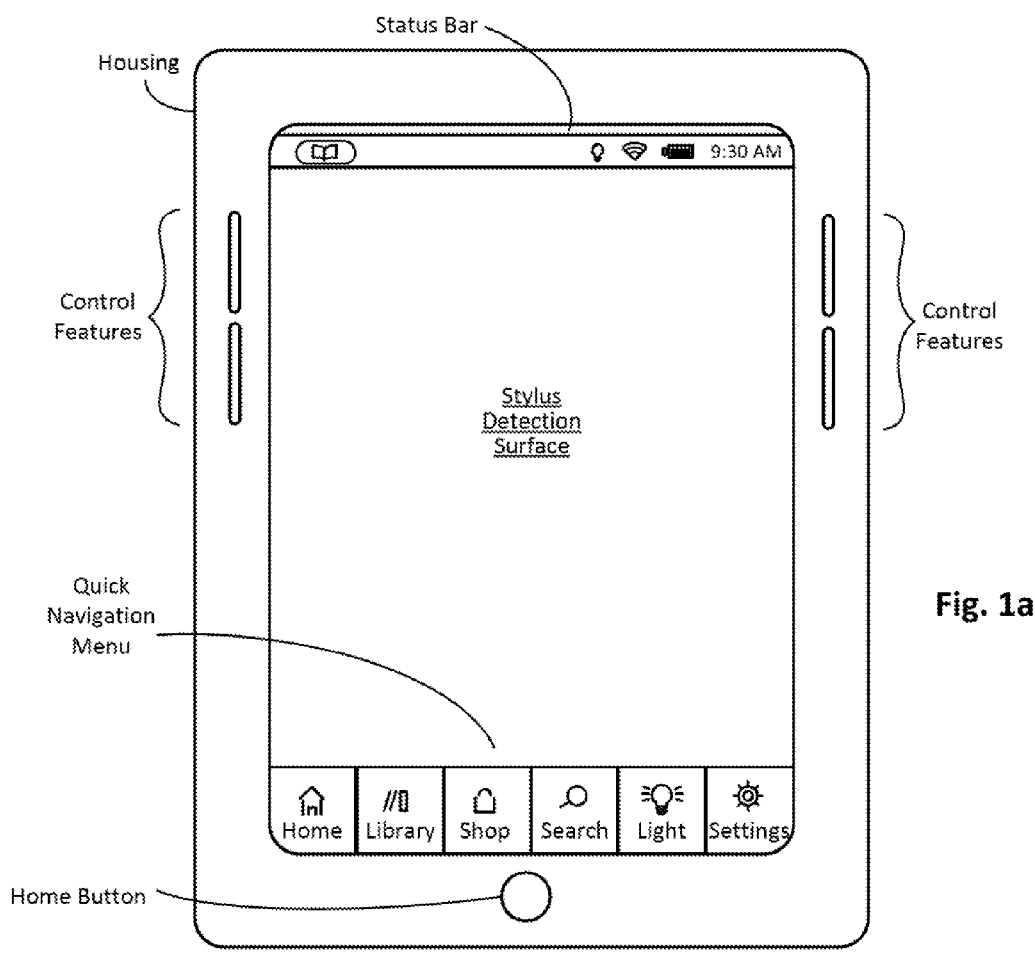
FIGS. 1a-b illustrate an example electronic computing device with a stylus detection surface, configured in accordance with an embodiment of the present invention.

Techniques are disclosed for performing functions in electronic devices by placing a device stylus in an idle position. The function may be, for example, activating a device idle mode, activating power saver or power-down mode, activating sleep mode, activating a screensaver, and/or locking the device. In some embodiments, placing a stylus in an idle position may include, for instance, setting the stylus in a horizontal position, setting the stylus in the same plane as the x-y plane of the device, setting the stylus in a stationary position with respect to the device, or latching the stylus to the device or to a protective device case. In some embodiments, the stylus and/or device can detect the stylus' angle of inclination with respect to the device, thus detecting whether the stylus is resting horizontally in a stationary position and activating the stylus idle mode. In other embodiments, when a magnetic stylus is latched to the device or device case, a magnetic sensor within the device may detect the stylus, thus activating a stylus idle mode. In some such embodiments, a magnet within the stylus may also be used to latch the stylus to the frame of the device or to the device case. In some embodiments, removing the stylus from an idle position, either by picking up the stylus or unlatching the stylus from the device, can cause the device to reactivate and abandon the stylus idle mode (or other mode induced by stylus idleness), thus returning the device to its previous operating mode. In some embodiments a hybrid stylus idle mode may be enabled, such that setting the stylus down horizontally, in the same plane as the device, or resting in a stationary position with respect to the device performs a first stylus idle function: while latching the stylus to the device or a device case performs a second stylus idle function. The various stylus idle functions may be user configurable in some embodiments. In some embodiments, a stylus idle function pop-up menu may accompany the stylus idle mode.

General Overview

As previously explained, electronic display devices such as tablets, eReaders, and smart phones are commonly used for displaying user interfaces and consumable content. In typical operation, the user might desire to, for example, put the device in idle mode, power saver mode, sleep mode, screensaver mode, locked mode, or turn the device off. While most electronic devices typically allow for a period of non-use or a series of actions to perform these various tasks or for automatic, there does not appear to be an intuitive idle-stylus based user interface function for performing such tasks.

Thus, and in accordance with an embodiment of the present invention, stylus-based techniques are provided for performing functions in electronic devices by placing a stylus in an idle position. In some embodiments, placing a stylus in an idle position may include setting the stylus down horizontally, setting the stylus down in the same plane as the device, setting the stylus down in a stationary position with respect to the device, or latching the stylus to the device or a device case. In some embodiments, placing a stylus in an idle position may be associated with a function such as locking the device, turning off the device, closing an application, putting the device in idle mode, sleep mode, screensaver mode, and other such functions that may be desirable for a device that is not being used or otherwise dormant. In one example embodiment, the stylus idle mode may employ angle detection techniques provided herein to calculate the angle of inclination between a stylus and the plane of the device. In such an example, the device may perform one of the stylus idle functions when the stylus is resting horizontally, or in a stationary position with respect to the device. In another example embodiment, the stylus may be latched to the frame of the device or a device casing. In such an example, the stylus magnet may be detected by a magnetic sensor within the device, thus activating a stylus idle mode. In some example embodiments, removing the stylus from the idle position (either by picking up the stylus or removing it from its latched position) can end the stylus idle function and return the device to normal operating mode.

In some embodiments, a hybrid stylus idle mode may be enabled, such that setting a stylus horizontally on a desk or table may perform one idle function, while latching a magnetic stylus to the side of the device or to a protective case of the device may perform a separate idle function. Such a hybrid mode may be useful, for example, in a classroom setting where the user may wish to put the device in a power saver mode (or any other desired operating mode) when not taking notes with the stylus. In such an embodiment, when the user is not actively using the stylus, the user may set the stylus on a desk next to the device, thus activating a power saver mode. In one such embodiment, the device may exit the power saver mode and return to normal functionality by simply picking up the stylus again. In another such embodiment, when the user is completely finished using the device for a period of time, latching the stylus to the side of the device may completely power down the device.

In some example embodiments, the stylus idle mode may be accompanied with animation and/or sound effects to further enhance the user interface experience. For example, a locking animation might show a padlock locking if the stylus idle mode is associated with locking the device. In a similar fashion, a powering-down sound might be played if the stylus idle mode is associated with powering down the device. The various sound effects or animations may be customizable by the user in some embodiments. A combination of animation and sound or other suitable notifications can be used as well, as will be appreciated in light of this disclosure. In another example embodiment, the stylus idle mode may be accompanied by a pop-up menu prompting the user to confirm the idle function or select the desired idle function from a list of available functions.

The techniques have a number of advantages, as will be appreciated in light of this disclosure. For instance, in some cases, the techniques can be employed to provide a discreet and intuitive way for a user to interact with a device without overly distracting the user (or others nearby) from other events occurring during the interaction. For instance, in some such embodiments, a student attending a lecture (either live or via a network) could be taking notes on a device with a stylus, and by setting the stylus next to the device a power saver mode may be activated to conserve device battery life while the student focuses attention on a lecture presenter. When the student is ready to begin taking notes again, simply picking up the stylus can reactivate the device and bring it out of sleep mode. Thus, in such an embodiment battery power is conserved using an intuitive and non-distracting stylus based idle mode.

Numerous uniquely identifiable engagement and notification schemes that exploit a stylus and a stylus detection surface to perform stylus idle functions by detecting the angle between a stylus and a detection surface can be used, as well as techniques that utilize a magnetic sensor, as will be appreciated in light of this disclosure. Further note that any suitable stylus detection surface (e.g., track pad, touch screen, electro-magnetic resonance (EMR) sensor grid, or other stylus sensitive surface, whether capacitive, resistive, acoustic, or other stylus detecting technology) may be used to detect the angle between the stylus and device, and the claimed invention is not intended to be limited to any particular type of stylus detection technology, unless expressly stated.

Architecture

Figure 1B:
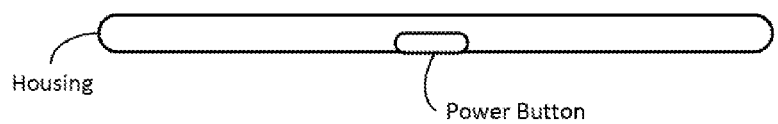

FIGS. 1a-b illustrate an example electronic computing device with a stylus detection surface configured with a stylus idle mode, in accordance with an embodiment of the present invention. As can be seen, in this example embodiment, the stylus detection surface is a touch screen surface. The device could be, for example, a tablet such as the NOOK® tablet or eReader by Barnes & Noble. In a more general sense, the device may be any electronic device having a stylus detection user interface and capability for displaying content to a user, such as a mobile phone or mobile computing device such as a laptop, a desktop computing system, a television, a smart display screen, or any other device having a stylus detection display or a non-sensitive display screen that can be used in conjunction with a stylus detection surface or a magnetic sensor. As will be appreciated, the claimed invention is not intended to be limited to any particular kind or type of electronic device.

As can be seen with this example configuration, the device comprises a housing that includes a number of hardware features such as a power button, control features, and a press-button (sometimes called a home button herein). A user interface is also provided, which in this example embodiment includes a quick navigation menu having six main categories to choose from (Home, Library, Shop, Search, Light, and Settings) and a status bar that includes a number of icons (a night-light icon, a wireless network icon, and a book icon), a battery indicator, and a clock. Other embodiments may have fewer or additional such user interface (UI) features, or different UI features altogether, depending on the target application of the device. Any such general UI controls and features can be implemented using any suitable conventional or custom technology, as will be appreciated.

The hardware control features provided on the device housing in this example embodiment are configured as elongated press-bars and can be used, for example, to page forward (using the top press-bar) or to page backward (using the bottom press-bar), such as might be useful in an eReader application. The power button can be used to turn the device on and off, and may be used in conjunction with a touch-based UI control feature that allows the user to confirm a given power transition action request (e.g., such as a slide bar or tap point graphic to turn power off). Numerous variations will be apparent, and the claimed invention is not intended to be limited to any particular set of hardware buttons or features, or device form factor.

In this example configuration, the home button is a physical press-button that can be used as follows: when the device is awake and in use, tapping the button will display the quick navigation menu, which is a toolbar that provides quick access to various features of the device. The home button may also be configured to cease an active function that is currently executing on the device, or close a configuration sub-menu that is currently open. The button may further control other functionality if, for example, the user presses and holds the home button. For instance, an example such push-and-hold function could engage a power conservation routine where the device is put to sleep or an otherwise lower power consumption mode. So, a user could grab the device by the button, press and keep holding as the device is stowed into a bag or purse. Thus, one physical gesture may safely put the device to sleep. In such an example embodiment, the home button may be associated with and control different and unrelated actions: 1) show the quick navigation menu; 2) exit a configuration sub-menu; and 3) put the device to sleep. As can be further seen, the status bar may also include a book icon (upper left corner). In some cases, selecting the book icon may provide bibliographic information on the content or provide the main menu or table of contents for the book, movie, playlist, or other content.

Figure 1C:
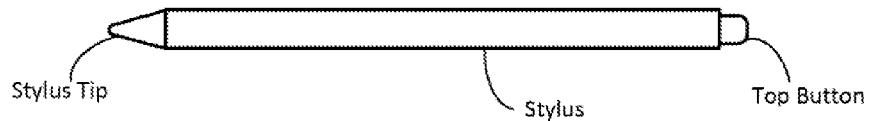
FIG. 1c illustrates an example stylus for use with an electronic computing device, configured in accordance with an embodiment of the present invention.

FIG. 1c illustrates an example stylus for use with an electronic computing device configured in accordance with an embodiment of the present invention. As can be seen, in this particular configuration, the stylus comprises a stylus tip used to interact with the stylus detection surface (by either direct contact or hover over interaction, or otherwise sufficiently proximate indirect contact) and a control features including a top push button. In this example, the stylus tip has a rounded triangular shape, while in alternative embodiments the stylus tip may be more rounded, or any other suitable shape. The stylus tip may be made of any number of materials of different textures and firmness depending on the needs of the specific device. The stylus may include fewer or additional control features than the top buttons illustrated in FIG. 1c, or different control features altogether. Such control features may include, for example, a rotating knob, a switch, a sliding control bar, or other suitable control features that will be apparent in light of this disclosure. The stylus may be an active or passive stylus, or any other suitable implement for interacting with the device and carrying out the stylus idle mode described herein. As will be appreciated, the claimed invention is not intended to be limited to any particular kind or type of stylus.

Figure 1D:
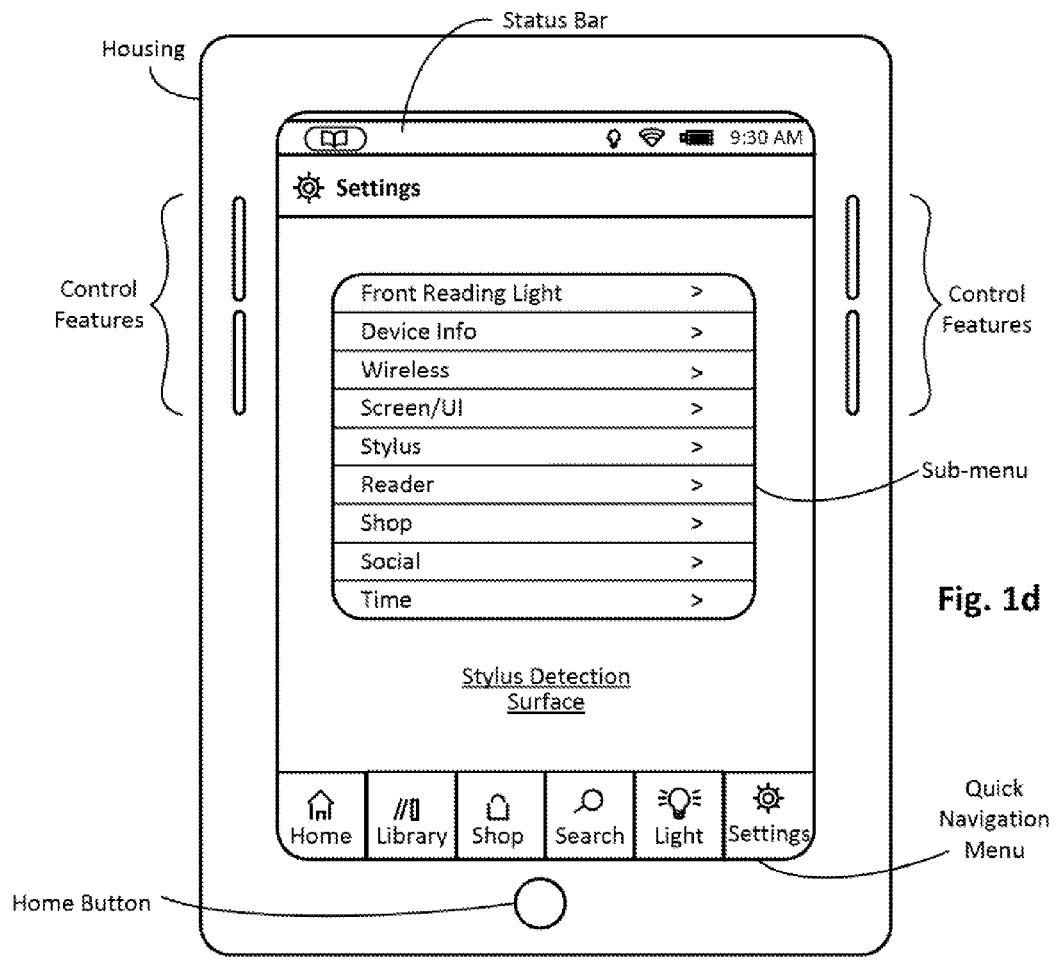
FIGS. 1d-e illustrate example configuration screen shots of the user interface of the electronic device shown in FIGS. 1a-b, configured in accordance with an embodiment of the present invention.
Figure 1E:
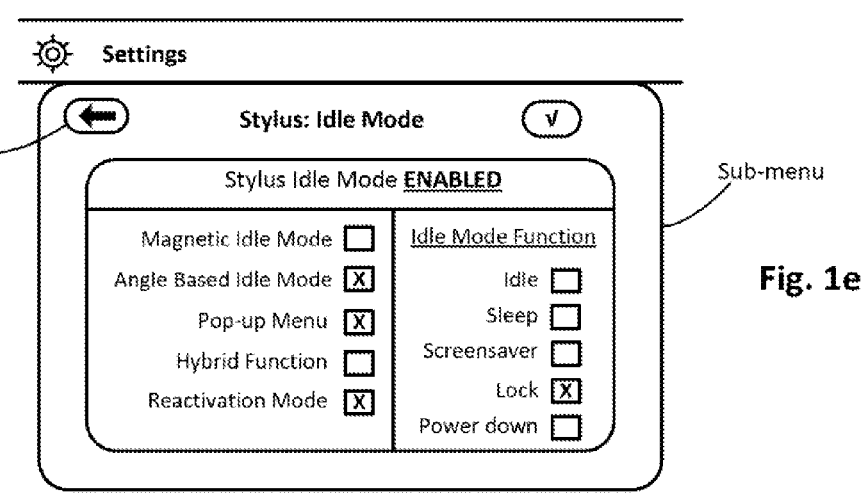

In one particular embodiment, a stylus idle mode configuration sub-menu, such as the one shown in FIG. 1e, may be accessed by selecting the Settings option in the quick navigation menu, which causes the device to display the general sub-menu shown in FIG. 1d. From this general sub-menu, the user can select any one of a number of options, including one designated Stylus in this specific example case. Selecting this sub-menu item may cause the configuration sub-menu of FIG. 1e to be displayed, in accordance with an embodiment. In other example embodiments, selecting the Stylus option may present the user with a number of additional sub-options, one of which may include a so-called "stylus idle mode" option, which may then be selected by the user so as to cause the stylus idle mode configuration sub-menu of FIG. 1 e to be displayed. Any number of such menu schemes and nested hierarchies can be used, as will be appreciated in light of this disclosure. In other embodiments, the stylus idle mode is hard-coded such that no configuration sub-menus are needed or otherwise provided (e.g., placing stylus horizontally for carrying out actions as described herein, with no user configuration needed). The degree of hard-coding versus user-configurability can vary from one embodiment to the next, and the claimed invention is not intended to be limited to any particular configuration scheme of any kind, as will be appreciated.

As will be appreciated, the various UI control features and sub-menus displayed to the user are implemented as touch screen controls in this example embodiment. Such UI screen controls can be programmed or otherwise configured using any number of conventional or custom technologies. In general, the touch screen display translates a specific touch or stylus input into an electrical signal which is then received and processed by the device's underlying operating system (OS) and circuitry (processor, etc). Additional example details of the underlying OS and circuitry in accordance with some embodiments will be discussed in turn with reference to FIG. 2a.

The stylus detection surface (or stylus detection display, in this example case) can be any surface that is configured with stylus detecting technologies capable of sensing the angle between a stylus and the display surface (or changes in that angle, as the case may be), whether capacitive, resistive, acoustic, active-stylus, and/or other input detecting technology. In some embodiments, the screen display can be layered above input sensors, such as a capacitive sensor grid for passive touch-based input, such as with a finger or passive stylus in the case of a so-called in-plane switching (IPS) panel, or an electro-magnetic resonance (EMR) sensor grid (e.g., for sensing a resonant circuit of the stylus). In some embodiments, the stylus detection display can be configured with a purely capacitive sensor, while in other embodiments the touch screen display may be configured to provide a hybrid mode that allows for both capacitive input and EMR input, for example. In still other embodiments, the stylus detection surface is configured with only an active stylus sensor. Numerous touch screen display configurations can be implemented using any number of known or proprietary screen based input detecting technologies. In any such embodiments, a stylus detection surface controller may be configured to selectively scan the stylus detection surface and/or selectively report stylus inputs.

In one example embodiment, once the device has detected the presence of the stylus, the device may calculate the angle between the stylus and the surface of the device. As will be appreciated in light of this disclosure, a stylus as used herein may be implemented with any number of passive and/or active stylus technologies, such as a DuoSense® pen by N-Trig® (e.g., wherein the stylus utilizes a touch sensor grid of a touch screen display) or EMR-based pens by Wacom technology, or any other commercially available or proprietary stylus technology. Further recall that the stylus sensor in the computing device may be distinct from an also provisioned touch sensor grid in the computing device. Having the touch sensor grid separate from the stylus sensor grid allows the device to, for example, only scan for a stylus input, a touch contact, or to scan specific areas for specific input sources, in accordance with some embodiments. In one such embodiment, the stylus sensor grid includes a network of antenna coils that create a magnetic field which powers a resonant circuit within the stylus. In such an example, the stylus may be powered by energy from the antenna coils in the device and the stylus may return the magnetic signal back to the device, thus communicating the stylus' location above the device, angle of inclination, speed of movement, etc. Such an embodiment also eliminates the need for a battery on the stylus because the stylus is powered by the antenna coils of the device. In one particular example, the stylus sensor grid includes more than one set of antenna coils. In such an example, one set of antenna coils may be used to merely detect the presence of a stylus sufficiently proximate to the device, while another set of coils determines with more precision the stylus' location and angle of inclination with respect to the device.

As previously explained, and with further reference to FIGS. 1d and 1e, once the Settings sub-menu is displayed (FIG. 1 d), the user can then select the Stylus option. In response to such a selection, the stylus idle mode configuration sub-menu shown in FIG. 1 e can be provided to the user. The user can configure a number of functions with respect to the stylus idle mode, in this example embodiment. For instance, in this example case, the configuration sub-menu includes a UI check box that when checked or otherwise selected by the user, effectively enables the stylus idle mode (shown in the enabled state); unchecking the box disables the mode. Other embodiments may have the stylus idle mode always enabled, or enabled by a physical switch or button located on either the device or the stylus, for example.

The stylus idle mode may be configured to perform various functions. Examples of possible functions that can be controlled using a stylus idle mode include, for instance, powering down the device, putting the device in idle mode, power save mode, sleep mode, screensaver mode, or locked mode. The desired stylus idle function may be selected using a UI check box, as shown in this particular example. In this particular example, the stylus idle function is associated with locking the electronic device. Stylus idle functions may be configured on a content-specific level, an application-specific level, or on a global level wherein placing the stylus in the idle position performs the same function regardless of the application running or type of content currently displayed at the time.

In some embodiments the user may enable a magnetic idle option, which may activate the stylus idle mode when a magnetic sensor of the device detects a magnet of the stylus when the stylus is latched to the device, thus triggering the desired stylus idle function. In the particular embodiment shown in FIG. 1e, the magnetic idle mode check box is not selected. In some embodiments, the user may enable an angle based idle option, in which the stylus idle mode is activated when the stylus is resting horizontally, in the same plane as the device itself is resting, or simply resting in a stationary position with respect to the device. In the particular embodiment shown in FIG. 1e, the angle-detection idle mode check box is selected. In still other embodiments, the user may enable a pop-up menu option, which presents a pop-up menu to the user when the stylus idle mode is activated, prompting the user to confirm the idle function or select the desired idle function. The example shown in FIG. 1e shows the pop-up menu check box selected. The user may also configure a hybrid function option in some embodiments. In such a hybrid embodiment, placing the stylus on a table next to the device may perform one stylus idle function, such as lock the device, while latching the stylus to the device may perform another idle function, such as powering down the device. In the example shown in FIG. 1e, the hybrid option is not selected. In other embodiments, the user may enable a device reactivation mode, which may cease the stylus idle function and return the device to normal operation when the stylus is removed from an idle position. In the example shown in FIG. 1 e, the stylus reactivation mode check box is selected. The various idle options and functions may be user configurable, or hard-coded.

In other configurable embodiments, user may specify a number of applications in which the stylus idle mode can be invoked, using UI check boxes, drop down menus, or other selection methods. Such a configuration feature may be helpful, for instance, in a tablet or laptop or other multi-function computing device that can execute different applications (as opposed to a device that is more or less dedicated to a particular application). In other embodiments, the idle mode can be invoked whenever the stylus is activated, regardless of the application being used (e.g., global functions). A hybrid of global functions and application-specific functions can be used as well, as will be appreciated in light of this disclosure. Any number of applications or device functions may benefit from a stylus-based idle mode as provided herein, whether user-configurable or not, and the claimed invention is not intended to be limited to any particular application or set of applications. In still other embodiments, various idle functions, application-specific functions, and/or global functions can be hard-coded.

In this particular example embodiment, the stylus sensitive display is a flat surface which may be assigned x-y coordinates wherein the x-axis generally runs from left to right across the content being displayed on the device and the y-axis generally runs from top to bottom across the content being displayed on the device. In some embodiments, the content displayed on the screen may change orientation with respect to the device frame or housing (e.g., when the user rotates the device to view content in either portrait or landscape mode), and as such the x-y coordinates discussed herein can be determined based on the content being displayed, rather than the physical frame of the device. In one example embodiment, the stylus angle can be measured with respect to the z-axis, wherein the z-axis extends away from the device normal to the x-y plane, with the resulting x-y quadrant indicative of the change effected. In one such case, any stylus resting with a substantially zero z-coordinate may be associated with a stylus resting in the idle position. In some embodiments, the stylus idle mode may include a range of angles near the horizontal, such that if a stylus is resting at a slight incline (e.g., at an angle of ±2°) the stylus idle mode may still be activated. In some embodiments, the stylus idle mode may determine the location of the stylus in addition to its angle of inclination, such that a stylus lying flat on top of the device may be associated with a different idle function than a stylus lying flat beside the device. In still other embodiments, the stylus idle mode may monitor the location and angle of inclination of the stylus and any lack of movement of the stylus for a determined period may activate the stylus idle function regardless of the orientation or angle of the stylus. Many other device/stylus functions will be apparent in light of this disclosure, and such functions may be hard-coded or user-configured (e.g., using a configuration sub-menu with check boxes or drop down menus, like the one shown in FIG. 1e).

In another example embodiment, the device and/or stylus may detect whether a stylus is resting in a substantially horizontal position using a mercury switch, or other suitable tilt switch or angle based switching mechanism. In one particular embodiment, a mercury switch may be used, wherein the switch contacts connect when the stylus is laid flat, causing a transmitter in the pen to notify the device that the stylus is in the idle position, thus activating a stylus idle function.

As can be further seen, a back button arrow UI control feature may be provisioned on the screen for any of the menus provided, so that the user can go back to the previous menu, if so desired. Note that configuration settings provided by the user can be saved automatically (e.g., user input is saved as selections are made or otherwise provided). Alternatively, a save button or other such UI feature can be provisioned, which the user can engage as desired. The configuration sub-menu shown in FIG. 1e is presented merely as an example of how a stylus idle mode may be configured by the user, and numerous other configurable or hard-codable aspects will be apparent in light of this disclosure. The techniques provided herein can be implemented on a global level, a content-based level, or an application level, in some example cases. Note that in some embodiments the various stylus idle functions may be visually demonstrated to the user as they are carried out power-down, lock, or other suitable function animations or sound effects. Such animations provide clarity to the function being performed, and in some embodiments the animations may be user-configurable while they may be hard-coded in other embodiments.

Figure 2A:
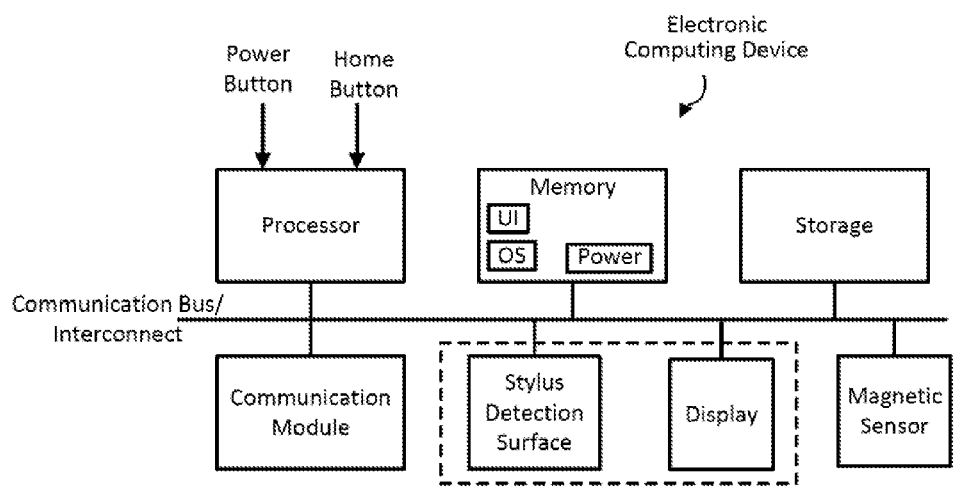
FIG. 2a illustrates a block diagram of an electronic computing device with a stylus sensitive display, configured in accordance with an embodiment of the present invention.

FIG. 2a illustrates a block diagram of an electronic computing device with a stylus sensitive display, configured in accordance with an embodiment of the present invention. As can be seen, this example device includes a processor, memory (e.g., RAM and/or ROM for processor workspace and storage), additional storage/memory (e.g., for content), a communications module, a display, a stylus detection surface, and a magnetic sensor. A communications bus and interconnect is also provided to allow inter-device communication. Other typical componentry and functionality not reflected in the block diagram will be apparent (e.g., battery, co-processor, audio module, etc.). Further note that in some embodiments the stylus detection surface may be integrated into the device display. Alternatively, the stylus detection surface may include a track pad, a housing configured with one or more acoustic sensors, a separate stylus sensitive surface that may be connected to the device via cables or a wireless link, etc. As discussed above, the stylus detection surface may employ any suitable input detection technology that is capable of determining a stylus angle of inclination that may be used to trigger a stylus idle function, such as those provided herein. The principles provided herein equally apply to any such stylus sensitive devices. For ease of description, examples are provided with stylus sensitive displays. Alternatively, the magnetic sensor of the device may be used to detect whether a stylus is in a latched idle position, and may trigger a stylus idle function without needing to calculate the stylus angle or orientation.

In this example embodiment, the memory includes a number of modules stored therein that can be accessed and executed by the processor (and/or a co-processor). The modules include an operating system (OS), a user interface (UI), and a power conservation routine (Power). The modules can be implemented, for example, in any suitable programming language (e.g., C, C++, objective C, JavaScript, custom or proprietary instruction sets, etc), and encoded on a machine readable medium, that when executed by the processor (and/or co-processors), carries out the functionality of the device including a UI having a stylus idle mode as described herein. The computer readable medium may be, for example, a hard drive, compact disk, memory stick, server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose built logic, or a microcontroller having input/output capability (e.g., inputs for receiving user inputs and outputs for directing other components) and a number of embedded routines for carrying out the device functionality. In short, the functional modules can be implemented in hardware, software, firmware, or a combination thereof.

The processor can be any suitable processor (e.g., 800 MHz Texas Instruments OMAP3621 applications processor), and may include one or more co-processors or controllers to assist in device control. In this example case, the processor receives input from the user, including input from or otherwise derived from the power button and the home button. The processor can also have a direct connection to a battery so that it can perform base level tasks even during sleep or low power modes. The memory (e.g., for processor workspace and executable file storage) can be any suitable type of memory and size (e.g., 256 or 512 Mbytes SDRAM), and in other embodiments may be implemented with non-volatile memory or a combination of non-volatile and volatile memory technologies. The storage (e.g., for storing consumable content and user files) can also be implemented with any suitable memory and size (e.g., 2 GBytes of flash memory). The display can be implemented, for example, with a 6-inch E-ink Pearl 800×600 pixel screen with Neonode® zForce® touch screen, or any other suitable display and touch screen interface technology. The communications module can be configured to execute, for instance, any suitable protocol which allows for connection to the stylus so that the stylus angle may be detected by the device, or to otherwise provide a communication link between the device and the stylus or other external systems. Note in some cases that actions of the stylus are communicated to the device by virtue of the stylus detection surface and not the communication module. Example communications modules may include an NFC (near field connection), Bluetooth, 802.11 b/g/n WLAN, or other suitable chip or chip set that allows for wireless connection to the stylus (including any custom or proprietary protocols). In some embodiments, a wired connection can be used between the stylus and device. In some specific example embodiments, the device housing that contains all the various componentry measures about 6.5" high by about 5" wide by about 0.5" thick, and weighs about 6.9 ounces. Any number of suitable form factors can be used, depending on the target application (e.g., laptop, desktop, mobile phone, etc). The device may be smaller, for example, for smartphone and tablet applications and larger for smart computer monitor applications.

The operating system (OS) module can be implemented with any suitable OS, but in some example embodiments is implemented with Google Android OS or Linux OS or Microsoft OS or Apple OS. As will be appreciated in light of this disclosure, the techniques provided herein can be implemented on any such platforms. The power management (Power) module can be configured as typically done, such as to automatically transition the device to a low power consumption or sleep mode after a period of non-use, or when prompted by the stylus idle mode. A wake-up from that sleep mode can be achieved, for example, by a physical button press and/or a stylus gesture (such as removing the stylus from the idle position), a touch screen swipe or other action. The user interface (UI) module can be, for example, based on touchscreen and stylus detection technology and the various example screen shots and use-case scenarios shown in FIGS. 1a, 1d-e, 3a-c, 4a-b, 5, and 6a-b in conjunction with the stylus idle mode methodologies demonstrated in FIG. 7, which will be discussed in turn. An audio module (not shown) may be configured, for example, to speak or otherwise aurally present a selected eBook table of contents or other textual content, if preferred by the user. Numerous commercially available text-to-speech modules can be used, such as Verbose text-to-speech software by NCH Software. In some example cases, if additional space is desired, for example, to store digital books or other content and media, storage can be expanded via a microSD card or other suitable memory expansion technology (e.g., 32 GBytes, or higher). Further note that although a touch screen display is provided, other embodiments may include a non-touch screen and a stylus sensitive surface such as a track pad, or a stylus sensitive housing configured with one or more acoustic sensors, etc.

Figure 2B:
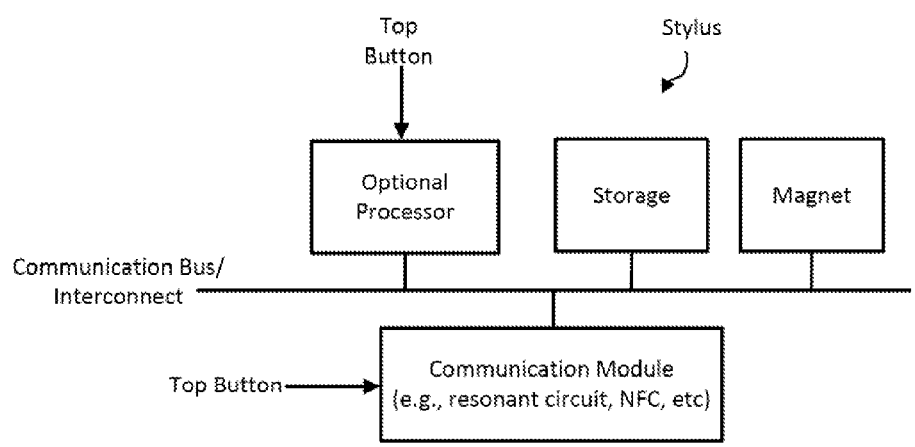
FIG. 2b illustrates a block diagram of a stylus configured in accordance with an embodiment of the present invention.

FIG. 2b illustrates a block diagram of a stylus configured in accordance with an embodiment of the present invention.

As can be seen, this specific example stylus includes a storage/memory, a magnet, and a communication module. A communications bus and interconnect may be provided to allow inter-device communication. When the stylus is in the idle position, the stylus magnet may be detected by the magnetic sensor of the device shown in FIG. 2a, thus activating a stylus idle mode. An optional processor may also be included in the stylus to provide local intelligence, but such is not necessary in embodiments where the electronic computing device with which the stylus is communicatively coupled provides the requisite control and direction. Other componentry and functionality not reflected in the block diagram will be apparent (e.g., battery, speaker, antenna, etc). The optional processor can be any suitable processor and may be programmed or otherwise configured to assist in controlling the stylus, and may receive input from the user from control features including the stylus top button. The storage may be implemented with any suitable memory and size (e.g., 2 to 4 GBytes of flash memory). In other example embodiments, storage/memory on the stylus itself may not be necessary. In other example embodiments, the stylus magnet may be used to fully implement the stylus idle mode: while in other embodiments the magnet may not be necessary if the stylus idle mode is fully implemented using the stylus communication module.

The communications module can be, for instance, any suitable module which allows for connection to a nearby electronic device so that information may be passed between the device and the stylus. Example communication modules may include an NFC, Bluetooth, 802.11 b/g/n WLAN, or other suitable chip or chip set which allows for connection to the electronic device. In other embodiments, the communication module of the stylus may implement EMR or other similar technologies that can communicate stylus information to a device, including stylus orientation and the angle between the stylus and the plane of the device, without a separate communications chip or chip set. In one such example, the stylus may include a communication module comprising a resonator circuit that effectively interacts with the device sensor grid. In such an example, the angle of the stylus can be determined using an EMR digitizer loop architecture implemented in the stylus detection surface of the device. For instance, a stylus angle of zero, where the stylus is resting in the plane of the device, may be associated with a given response signal, wherein the resonant frequency of the stylus tank circuit can then be picked up by a transmit/receive coil(s) of the digitizer included in the stylus detection surface, assuming an EMR-based detection scheme. In such cases, the resonant frequency may be detected by the stylus detection surface of the device, and the stylus angle information is known therefrom (based on angle of incidence on digitizer), thus triggering an appropriate stylus idle function at the device. In a more general sense, an EMR detection grid on the stylus detection surface of the device may monitor the angle of the stylus and detect when the angle between the stylus and the device changes, thus activating a stylus idle function when the stylus is resting horizontally, in the same plane as the device, or resting in a stationary position with respect to the device. Note in such a case that a separate dedicated communication module on the electronic computing device and stylus may be optional.

In another example case, the stylus may have an angle computation module on-board (e.g., executing in optional processor that works in conjunction with one or more sensors to detect relative and/or absolute angle changes) and the communications module (e.g., Bluetooth link, etc) may be used to communicate the computed stylus angle back to the device, wherein such inputs can be used to enable the various functions of the communications module. In still other embodiments, a UI-based calibration routine can be used to allow the user to assign specific stylus positions and angles with the various stylus idle functions. In one such embodiment, a stylus angle calibration routine can be executed on the device and display a user interface that lets the user select from a list of desired stylus idle functions in real-time while executing a given stylus angle/position. Thus, for each stylus angle/position presented to the device by the user, a desired stylus idle function can be assigned.

As will be further appreciated, commands may be communicated and/or target content may be transferred between (e.g., copied or cut or pasted) the stylus and the electronic device over a communication link. In one embodiment, the stylus includes memory storage and a transceiver, but no dedicated processor. In such an embodiment, the processor of the electronic device communicates with the transceiver of the stylus and performs the various functions as indicated by the user.

Figure 2C:
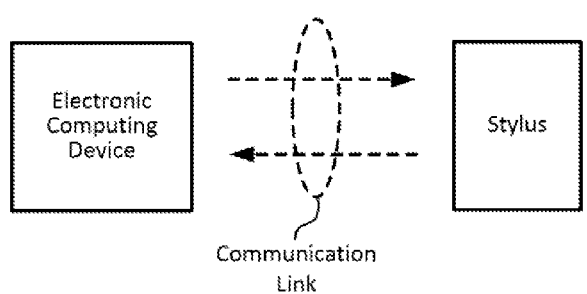
FIG. 2c illustrates a block diagram of a communication link between the electronic computing device of FIG. 2a and the stylus of FIG. 2b, configured in accordance with an embodiment of the present invention.

FIG. 2c illustrates a block diagram showing a communication link between the electronic computing device of FIG. 2a and the stylus of FIG. 2b, according to one embodiment of the present invention. As can be seen, the system generally includes an electronic computing device that is capable of wirelessly connecting to other devices and a stylus that is also capable of wirelessly connecting to other devices. In this example embodiment, the electronic computing device may be, for example, an e-Book reader, a mobile cell phone, a laptop, a tablet, desktop, or any other stylus sensitive computing device. As described above, the communication link may include an NFC, Bluetooth, 802.11 b/g/n WLAN, electro-magnetic resonance, or other suitable communication link which allows for communication between one or more electronic devices and a stylus. In some embodiments EMR technology may be implemented along with one or more of NFC, Bluetooth, 802.11 b/g/n WLAN, etc. In one such example, EMR may be used to power a stylus and calculate the angle between the stylus and the device, while NFC may enable data transfer between the stylus and the device. In some embodiments, the stylus may be configured and/or recalibrated in real-time over the communication link. In one such example, the user may adjust stylus configuration settings using the various menus and submenus such as those described in FIGS. 1d-e and the stylus may be reconfigured in real-time over the communication link.

Example Stylus Angle Functions

Figure 3A:
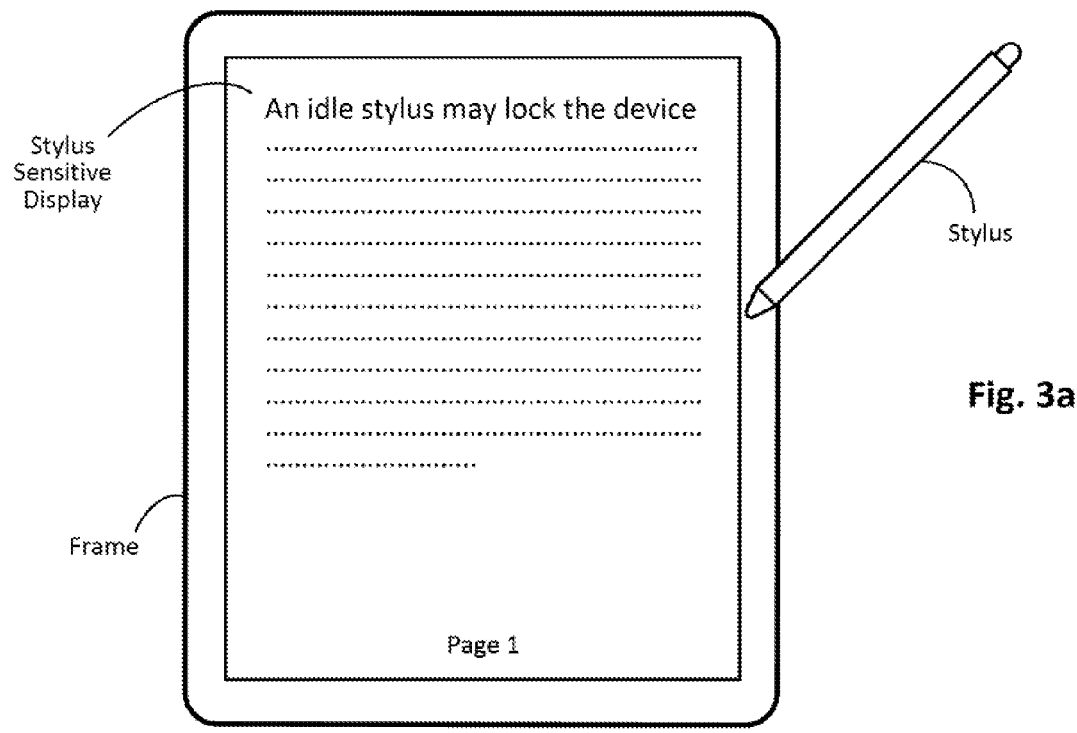
FIGS. 3a-c illustrate an example of an electronic stylus sensitive device and stylus having a stylus idle mode, in accordance with an embodiment of the present invention.
Figure 3B:
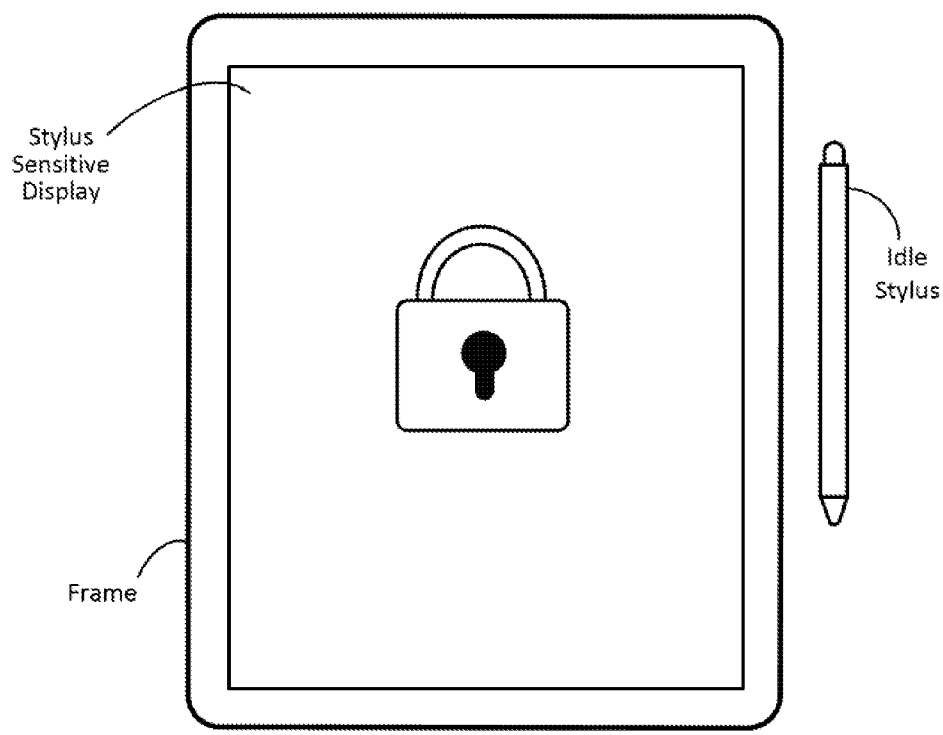
Figure 3C:
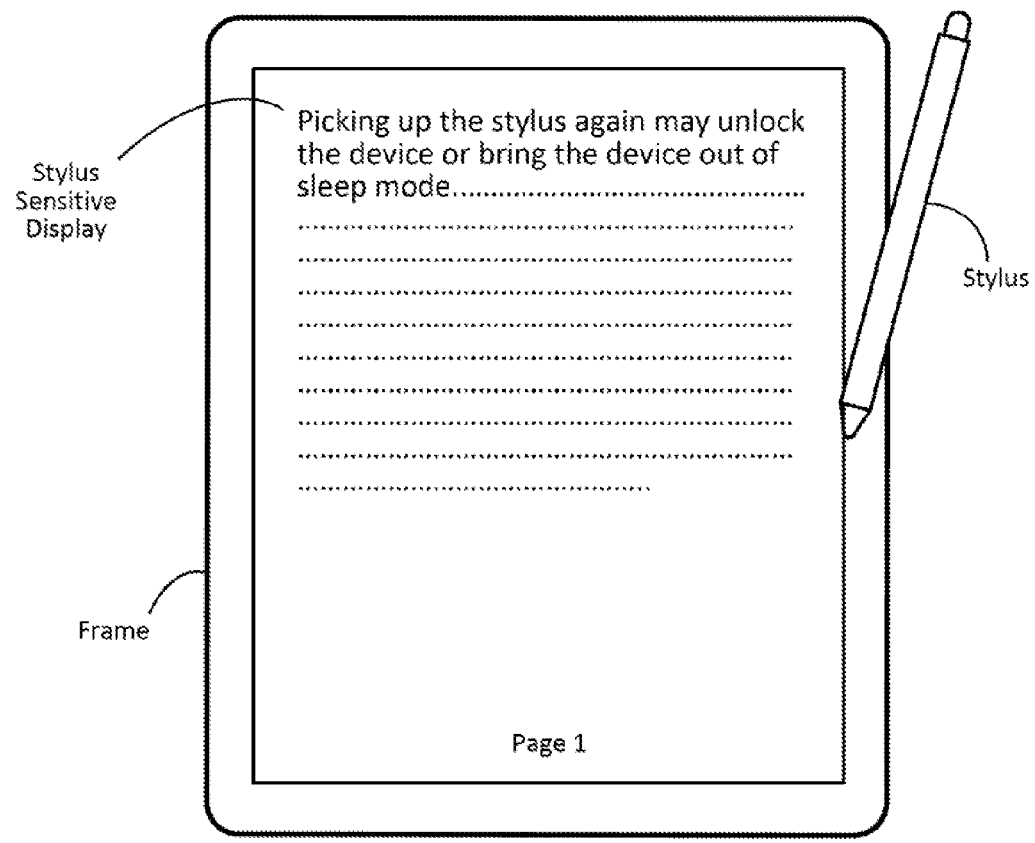

FIGS. 3a-c illustrate an example of an electronic stylus sensitive device and stylus having a stylus idle mode, in accordance with an embodiment of the present invention. As can be seen, a physical frame or support structure is provided about the stylus sensitive display. In this particular example scenario, the stylus idle mode is associated with locking the device. In this example case, a text document is running, as shown in FIG. 3a, the stylus angle based idle mode is enabled, and the stylus reactivation function is also enabled (e.g., as described in reference to FIG. 1e, or hard-coded). As seen in FIG. 3b, when the stylus is placed down next to the device, the device may detect the angle between itself and the stylus. In this example embodiment, when the device detects a stylus resting horizontally, in the same plane as the device, or in a stationary position with respect to the device, the stylus idle function is triggered and the device is locked. As shown in FIG. 3c, removing the stylus from the idle position by picking it up again may activate the stylus reactivation function and unlock the device, returning it to its previous operating mode. In this specific example, picking up the stylus prompts the device to display the text document again. In some embodiments the stylus idle mode functions may be accompanied by graphics or sounds, or a combination of graphics and sounds.

Figure 4A:
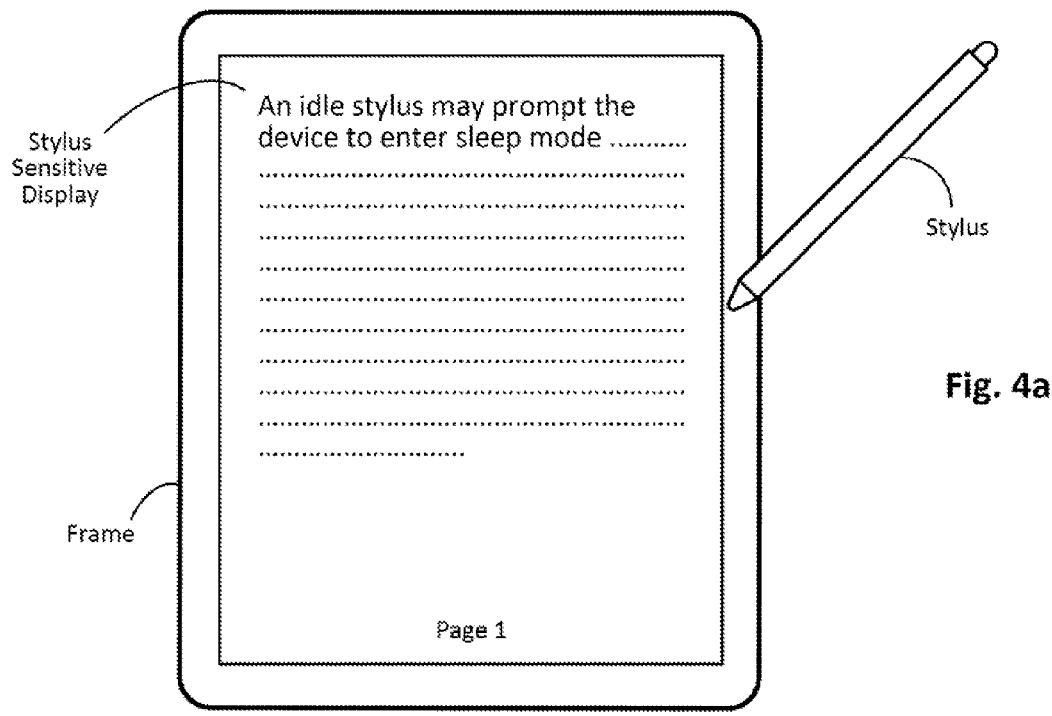
FIGS. 4a-b illustrate an example of an electronic stylus sensitive device and stylus having a stylus idle mode, in accordance with an embodiment of the present invention.
Figure 4B:
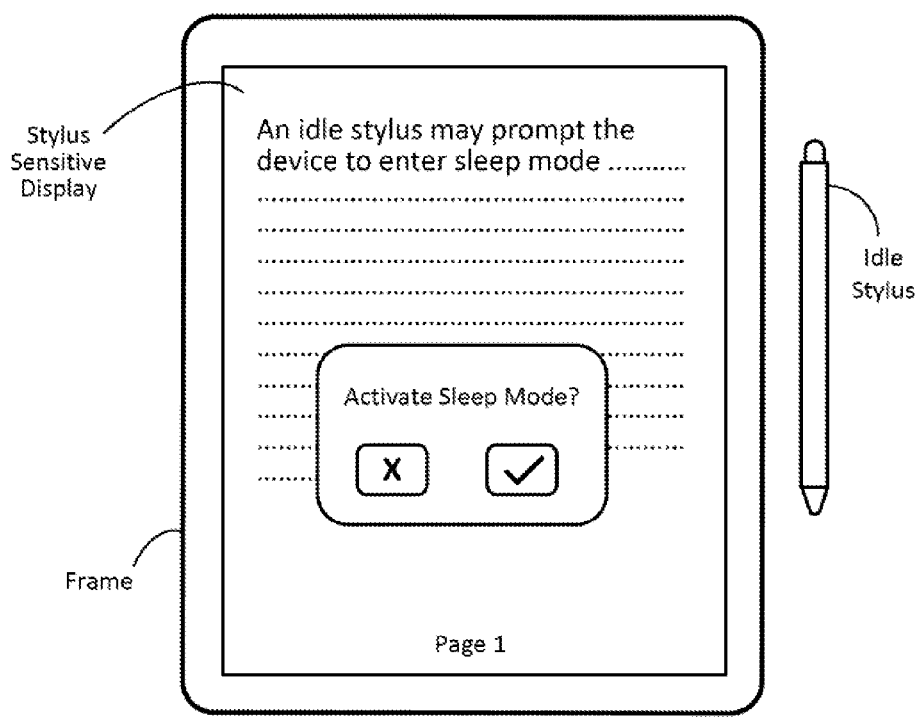

FIGS. 4a-b illustrate an example of an electronic stylus sensitive device and stylus having a stylus idle mode, in accordance with another embodiment of the present invention. As can be seen, a physical frame or support structure is provided about the stylus sensitive display. In this particular example scenario, the stylus idle mode is associated with putting the device to sleep and the pop-up menu option has been enabled (e.g., hard-coded or via a configuration sub-menu). In this example case, a text document is running, as shown in FIG. 4a, and the stylus angle based idle mode is enabled (e.g., as described in reference to FIG. 1 e, or hard-coded). As seen in FIG. 4b, when the stylus is placed down next to the device, the angle between the device and the stylus may be detected, thus triggering the stylus idle mode and displaying the pop-up menu. In this particular embodiment, the pop-up menu prompts the user to confirm the stylus idle function by tapping or otherwise selecting the check mark UI feature to activate sleep mode, or selecting the "X" UI feature to abandon the stylus idle mode. Such a feature may be useful when the user wants to set down the stylus without performing any function. In some embodiments the stylus idle function may activate after a certain period of time (e.g., after five seconds) if the user does not select any of the available pop-up menu UI features. Many other pop-up or function confirmation menus are possible and will be apparent in light of this disclosure.

Figure 5:
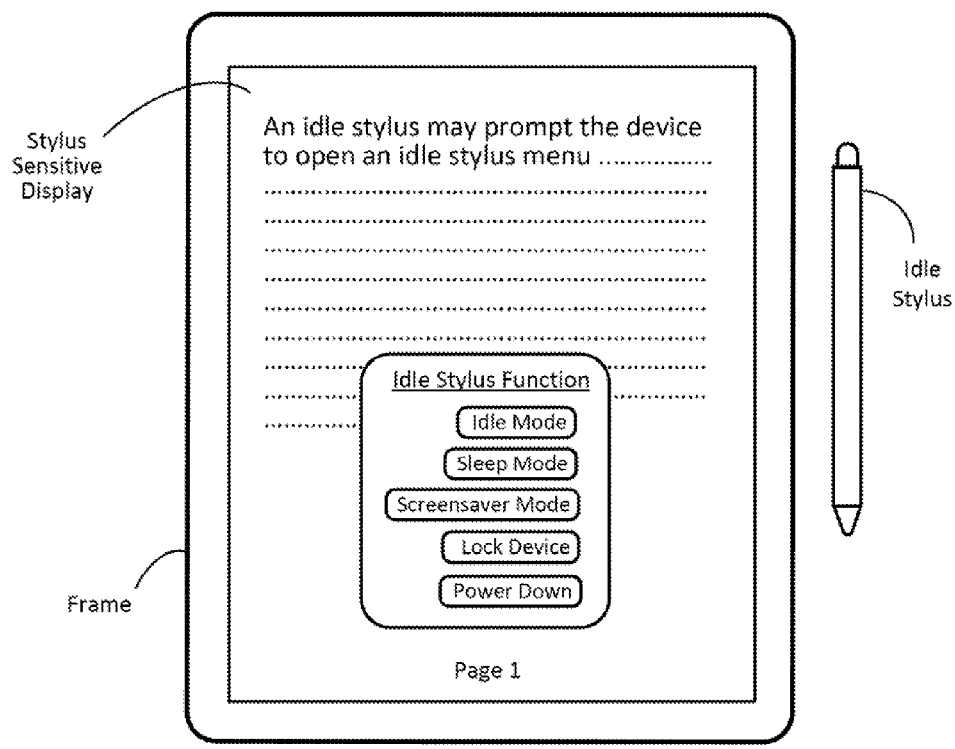
FIG. 5 illustrates an example of an electronic stylus sensitive device and stylus having a stylus idle mode, in accordance with an embodiment of the present invention.

FIG. 5 illustrates an example of an electronic stylus sensitive device and stylus having a stylus idle mode, in accordance with another embodiment of the present invention. As can be seen, a physical frame or support structure is provided about the stylus sensitive display. In this particular example scenario, the stylus idle mode is configured to display a pop-up menu (e.g., hard-coded or via a configuration sub-menu), such that the user may select the desired stylus idle function from the pop-up menu. In this example case, a text document is running, and the stylus angle based idle mode is enabled (e.g., as described in reference to FIG. 1e, or hard-coded). In such an embodiment, when the stylus is placed down next to the device, the angle between the device and the stylus may be detected, thus triggering the stylus idle mode and displaying the pop-up menu which may provide the user with a number of labeled UI control features. This particular example provides the user with various idle mode functions that may be selected by tapping the UI control features. The idle functions available include putting the device in idle mode, sleep mode, screensaver mode, locked mode, and powering down the device. Tapping any of the control features enables that specific function, in one example embodiment.

Figure 6A:
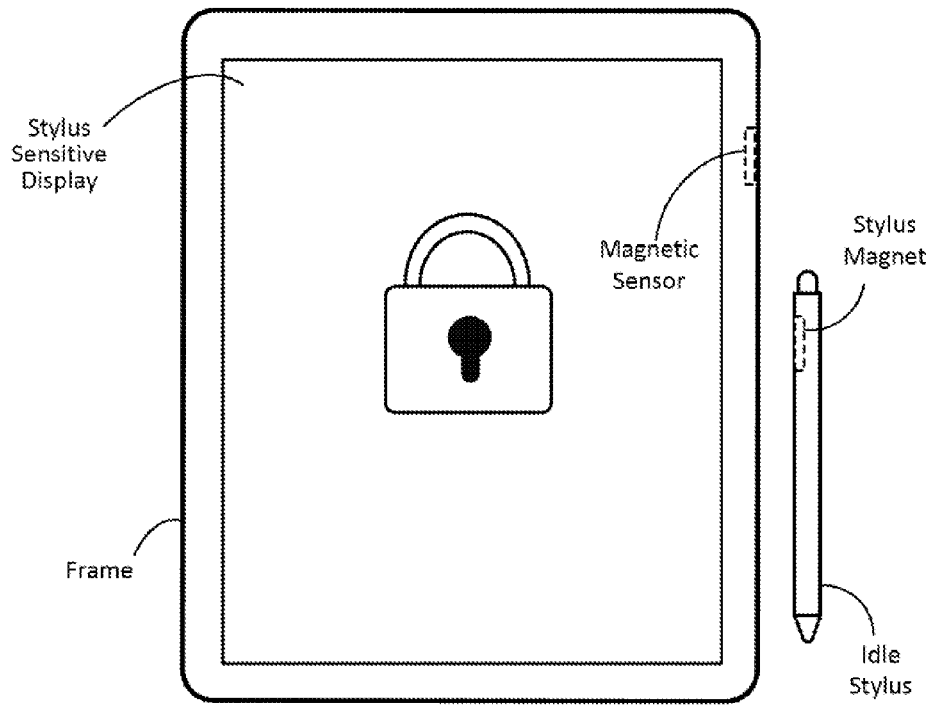
FIGS. 6a-b illustrate an example of an electronic stylus sensitive device and stylus having a hybrid stylus idle mode, in accordance with an embodiment of the present invention.
Figure 6B:
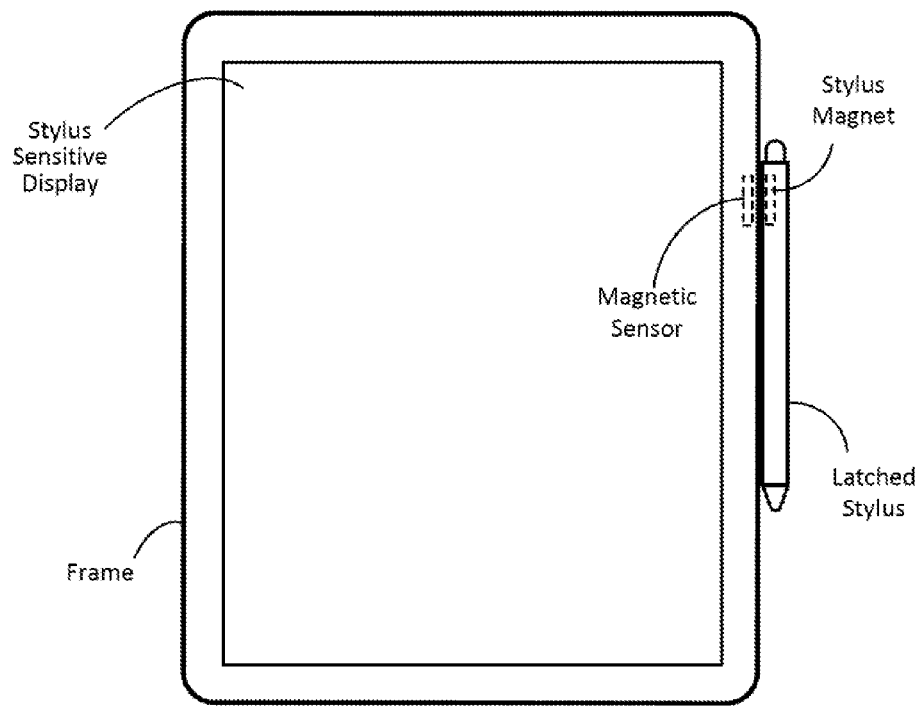
Figure 7:
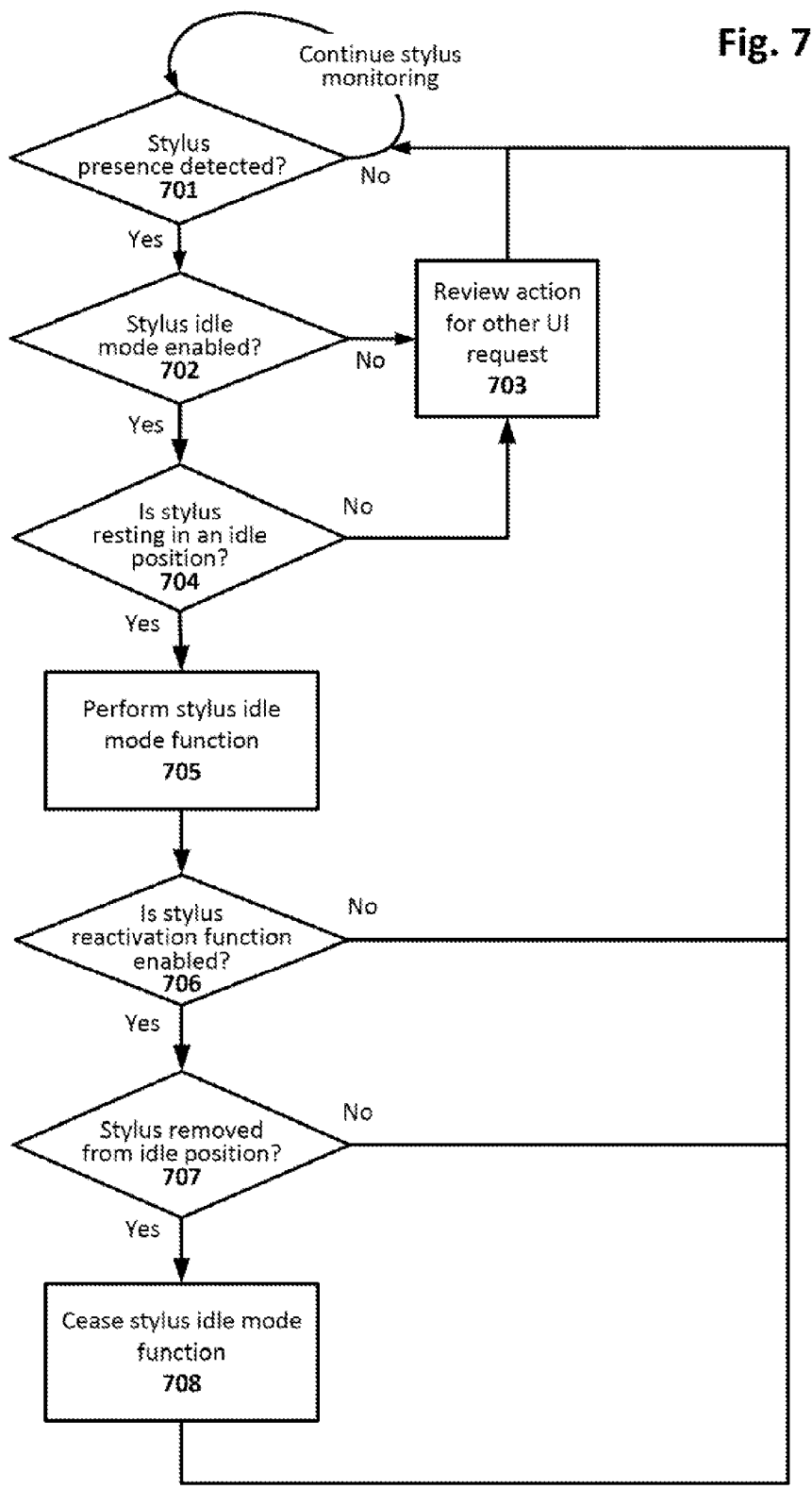
FIG. 7 illustrates a method for performing functions in electronic devices using a stylus idle mode, in accordance with an embodiment of the present invention.

FIGS. 6a-b illustrate an example of an electronic stylus sensitive device and stylus having a hybrid stylus idle mode, in accordance with an embodiment of the present invention. As can be seen, a physical frame or support structure is provided about the stylus sensitive display, and the device includes a magnetic sensor that can detect the presence of a stylus magnet. In one example embodiment, the device includes Hall sensors that could indicate pen attachment by detecting the stylus magnet. In some cases the stylus magnet is also used to latch the stylus to the device or the device's protective case. In other cases, the stylus may be fixed to the device using other means, such as a physical clip or stylus sheath, and the stylus magnet is used only to activate a magnetic stylus idle function. In the particular example scenario shown in FIGS. 6a-b, the stylus angle based idle mode is associated with locking the electronic device, while the magnetic idle mode is associated with powering down the device (e.g., hard-coded or via a configuration sub-menu). In such an embodiment, when the stylus is placed horizontally next to the device, as shown in FIG. 6a, the angle based idle mode locks the device. When the stylus is magnetically latched to the device, as shown in FIG. 6b, the magnetic sensor of the device detects the presence of the stylus magnet and activates the magnetic stylus idle mode, thus powering down the device.

Methodology

FIG. 8 illustrates a method for performing functions in electronic devices using a stylus idle mode, in accordance with an embodiment of the present invention. This example methodology may be implemented, for instance, by the UI module of the electronic computing device shown in FIG. 2a. To this end, the UI module can be implemented in software, hardware, firmware, or any combination thereof, as will be appreciated in light of this disclosure. The various stylus angles may be communicated to the device over a communication link (e.g., EMR link, and/or dedicated communication link such as NFC or Bluetooth).

In general, any stylus sensitive surface may be used to detect the angle between the stylus and the device surface, or a magnetic sensor on the device may detect the presence and location of a stylus magnet. As discussed above, EMR or other suitable technology may be implemented to detect the presence of a stylus as well as its angle of inclination with respect to the electronic device. In one particular example, EMR technology may be implemented to power a stylus and/or provide angle detection signals that allow a processor of the device to calculate the stylus' angle of inclination. In one such example, a stylus angle change effectively manipulates the resonant circuit within the stylus which may in turn be detected by the antenna coils of the stylus detection grid of the device, thus triggering a response at the device. Various stylus angle changes thus create different detection signals, and thus may be assigned distinct functions. To this end, stylus angle detections can be used to implement UI functionality.

In this example case, the method includes determining 701 whether a stylus presence has been detected, which may include a physical stylus contact on the stylus detection surface, input received when the stylus is hovering over or is otherwise sufficiently proximate to the stylus detection surface, or input received from the magnetic sensor of the device detecting the presence of a stylus magnet. In some embodiments, monitoring for stylus input includes monitoring all or part of a stylus sensitive display screen. In general, the stylus monitoring is effectively continuous, and once a stylus presence has been detected, the method may continue with determining 702 whether the stylus idle mode is enabled. In some embodiments, the stylus idle mode is always enabled, while in other embodiments it may be enabled using a stylus control feature, or it may only be enabled for particular applications or functions. If the stylus idle mode is not enabled, the method may continue with reviewing 703 the stylus input for other UI requests. If the stylus idle mode is enabled, the method may continue with determining 704 whether the stylus is resting in an idle position. In some embodiments, the idle position may include a stylus resting horizontally, resting in the same plane as the device, resting in a stationary position with respect to the device, or latched to the device or device case. As previously explained, the stylus angle of inclination can be determined based on any number of suitable technologies, such as EMR, a calibration routine that correlates stylus orientation to a look-up table of known angles, a tilt switch within the stylus, off-the-shelf inclination sensors, or any other technology that provides a signal that can be correlated to a particular angle or range of angles within a given two-dimensional or three-dimensional space, as will be appreciated in light of this disclosure. In some embodiments, the stylus may be latched to the side of the device or to a protective casing of the device using a magnet, clip, sleeve, sheath, or other suitable technique. In one such embodiment, the stylus is a magnetic stylus, and a magnetic sensor within the device can detect whether the stylus is latched to the device. If the stylus is not resting in an idle position, the method may continue with reviewing 703 the stylus input for other UI requests. If the stylus is resting in an idle position, the method may continue with performing 705 the stylus idle mode function. The idle mode function may be user configurable or hard-coded in some instances, and in some embodiments the stylus idle function may be accompanied by sounds, animations, or a pop-up menu that may prompt the user to select the desired idle function or confirm the idle function. In some embodiments a hybrid idle function may be enabled, where one stylus idle function may be assigned to a stylus resting in a stationary position with respect to the device, while another stylus idle function is assigned to a stylus latched to the device or device case.

After performing 705 the stylus idle mode function, the method may continue with determining 706 whether the stylus reactivation function is enabled. In some embodiments, the stylus reactivation function allows the user to abandon the current stylus idle mode function by removing the stylus from the idle position. In some embodiments, removing the stylus from the idle position includes unlatching the stylus from the device or moving the stylus from a stationary resting position. If the stylus reactivation function is enabled, the method may continue with determining 707 whether the stylus has been removed from the idle position. If the stylus has been removed from the idle position, the method may continue with ceasing 708 the stylus idle mode function. In some embodiments, ceasing the idle mode function may include reactivating the device and returning it to its previous mode of operation before the stylus was idle. If the stylus reactivation function is not enabled 706, if the stylus is not removed from the idle position 707, or after ceasing the stylus idle function 708, the method may continue with monitoring for further stylus inputs.

Numerous variations and embodiments will be apparent in light of this disclosure. One example embodiment of the present invention provides a system including an electronic device having a display for displaying content to a user and a stylus detection surface for allowing user input. The system also includes a user interface operable on the electronic device and including a stylus idle mode, wherein the stylus idle mode is configured to perform a function in response to a stylus being placed in an idle position. In some cases, the system further includes a stylus, wherein the stylus is configured to wirelessly communicate with the electronic device via the stylus detection surface. In some cases, the stylus idle mode is further configured to detect stylus position with respect to the electronic device, and wherein a stylus placed in an idle position includes a stylus resting in a stationary position with respect to the electronic device. In some cases, the stylus idle mode is further configured to detect stylus angle of inclination, and wherein a stylus placed in an idle position includes a stylus resting horizontally. In some cases, the stylus idle mode is further configured to detect stylus angle of inclination with respect to the stylus detection surface, and wherein a stylus placed in an idle position includes a stylus resting in the same plane as the stylus detection surface. In some cases, the stylus detection surface includes at least one set of antenna coils configured to interact with a resonant circuit within the stylus and detect stylus angle of inclination with respect to the stylus detection surface. In some cases, a stylus placed in an idle position includes a magnetic stylus latched to the device or to a device case, and wherein a magnetic sensor within the device is configured to detect the magnetic stylus position. In some cases, the stylus idle mode is further configured to cease the function in response to a stylus being removed from an idle position. In some cases, the function includes at least one of activating a device idle mode, activating power saver mode, activating sleep mode, activating a screensaver, locking the device, and/or turning the device off. In some cases, the user interface is further configured to configure the stylus in real-time over a wireless communication link to the stylus. In some cases, the function is user-configurable. In some cases, the electronic device is further configured to provide at least one of an audio and/or visual notification associated with the function. In some cases, the electronic device is further configured to provide at least one of a function selection pop-up menu or a function confirmation pop-up menu associated with the stylus idle mode. In some cases, the electronic device is an eReader device or a tablet computer or a smartphone. Numerous variations will be apparent. For instance, another embodiment provides a mobile computing device that includes the system as variously defined in this paragraph.

Another example embodiment of the present invention provides a system including a stylus. The system also includes an electronic device having a display for displaying content to a user and a stylus detection surface for allowing user input via the stylus. The system also includes a user interface executable on the device and including a stylus idle mode, wherein the stylus idle mode is configured to determine an angle of inclination between the stylus and the stylus detection surface, and is further configured to perform a function in response to the stylus being placed in an idle position.

Another example embodiment of the present invention provides a computer program product including a plurality of instructions non-transiently encoded thereon to facilitate operation of an electronic device according to a process. The computer program product may include one or more computer readable mediums such as, for example, a hard drive, compact disk, memory stick, server, cache memory, register memory, random access memory, read only memory, flash memory, or any suitable non-transitory memory that is encoded with instructions that can be executed by one or more processors, or a plurality or combination of such memories. In this example embodiment, the process is configured to determine an angle of inclination between a stylus and a stylus detection surface of the electronic device, and perform a function in response to a stylus being placed in an idle position based on the angle of inclination. In some cases, the function includes at least one of activating a device idle mode, activating sleep mode, turning on a screensaver, locking the device, and/or turning the device off. In some cases, the angle of inclination between the stylus and the stylus detection surface is determined by determining the location of a resonant circuit within the stylus. In some cases, a stylus placed in an idle position includes a stylus resting in a stationary position with respect to the stylus detection surface.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system, comprising:
   an electronic device having a display for displaying content to a user and a stylus detection surface for allowing user input via a stylus, the stylus including an elongated body portion having a main axis and a stylus tip on an end of the elongated body portion, wherein the stylus tip is for interacting with the stylus detection surface; and
   a user interface operable on the electronic device and comprising a stylus idle mode configured to detect stylus position with respect to the electronic device and to perform:
      a first idle function in response to the stylus being placed in a first idle position that includes the stylus resting next to but not touching the electronic device, wherein the first idle position includes the main axis of the elongated body portion of the stylus being substantially parallel to a plane defined by the display of the electronic device; and
      a second idle function in response to the stylus being placed in a second idle position that includes the stylus being attached to the electronic device;
   wherein the first idle function includes transitioning, after the stylus has been resting in the first idle position for at least a first threshold period of time, the electronic device from a first power consumption mode having a first power consumption rate to a second power consumption mode having a second power consumption rate less than the first power consumption rate, and
   wherein the second idle function includes transitioning, after the stylus has been resting in the second idle position for at least a second threshold period of time, the electronic device to a third power consumption mode having a third power consumption rate less than both the first and second power consumption rates.

2. The system of claim 1, wherein the stylus is configured to wirelessly communicate with the electronic device via the stylus detection surface.

3. The system of claim 1, wherein the stylus idle mode is further configured to detect a stylus angle of inclination, and wherein the stylus placed in the first idle position comprises the stylus resting horizontally in the plane defined by the display of the electronic device.

4. The system of claim 1, wherein the stylus detection surface comprises at least one set of antenna coils configured to interact with a resonant circuit within the stylus and detect a stylus angle of inclination with respect to the stylus detection surface.

5. The system of claim 1, wherein the stylus being placed in the second idle position comprises a magnetic stylus magnetically latched to the device or to a device case, and wherein a magnetic sensor within the device is configured to detect attachment of the magnetic stylus to the device or the device case.

6. The system of claim 1, wherein the stylus idle mode is further configured to cease at least one of the first idle function and the second idle function in response to the stylus being removed from the first idle position and the second idle position, respectively.

7. The system of claim 1, wherein transitioning the electronic device to the second power consumption mode comprises at least one of activating a device idle mode, activating power saver mode, activating sleep mode, activating a screensaver, and locking the device.

8. The system of claim 1 wherein the user interface is further configured to configure the stylus in real-time over a wireless communication link to the stylus.

9. The system of claim 1, wherein the first idle function and the second idle function are user-configurable.

10. The system of claim 1, wherein the electronic device is further configured to provide at least one of an audio and/or visual notification associated with each of the first idle function and the second idle function.

11. The system of claim 1, wherein the electronic device is further configured to provide at least one of a function selection pop-up menu or a function confirmation pop-up menu associated with the stylus idle mode.

12. The system of claim 1 wherein the electronic device is an eReader device or a tablet computer or a smartphone.

13. A mobile computing device comprising the system of claim 1.

14. The system of claim 1, wherein the stylus being substantially parallel to the plane defined by the display of the electronic device comprises an angle of plus or minus 2 degrees.

15. A system, comprising:
   a stylus that includes an elongated body portion having a main axis and a stylus tip on an end of the elongated body portion, wherein the stylus tip is for interacting with a stylus detection surface;
   an electronic device having a display for displaying content to a user and having the stylus detection surface for allowing user input via the stylus; and
   a user interface executable on the device and including a stylus idle mode, wherein the stylus idle mode is configured to perform:
      a first idle function in response to the stylus resting in a first idle position next to but not touching the electronic device, wherein the first idle position includes the main axis of the elongated body portion of the stylus being substantially parallel to a plane defined by the display of the electronic device;
      a second idle function in response to the stylus being placed in a second idle position that includes the stylus being attached to the electronic device;
   wherein the first idle function includes transitioning, after the stylus has been resting in the first idle position for at least a first threshold period of time, the electronic device from a first power mode having a first power consumption rate to a second power mode having a second power consumption rate less than the first power consumption rate, the second power mode comprising at least one of a device idle mode, a screensaver, and a locked screen mode; and
   wherein the second idle function includes transitioning, after the stylus has been resting in the second idle position for at least a second threshold period of time, the electronic device to a third power consumption mode having a third power consumption rate less than both the first and second power consumption rates, the third power consumption mode comprising one of a sleep mode and an off mode.

16. A non-transitory computer program product comprising a plurality of instructions encoded thereon and executable by a processor to facilitate operation of an electronic device according to a process, the process comprising:
- determine an angle of inclination of a stylus with respect to a stylus detection surface of the electronic device, the angle of inclination determined by detecting an angle between a main axis of an elongated body portion of the stylus and a plane defined by the stylus detection surface;
- perform a first idle function in response to the stylus being placed in a first idle position in which the angle of inclination of the stylus with respect to the stylus detection surface corresponds to the stylus resting proximate to, but not in contact with, the stylus detection surface that is substantially parallel to the stylus detection surface;
- perform a second idle function in response to the stylus being placed in a second idle position that includes the stylus being attached to the electronic device;
- wherein the first idle function includes transitioning the electronic device from a first power consumption mode having a first power consumption rate to a second power consumption mode having a second power consumption rate less than the first power consumption rate; and
- wherein the second idle function includes transitioning the electronic device to a third power consumption mode having a third power consumption rate less than both the first and second power consumption rates.

17. The non-transitory computer program product of claim 16, wherein transitioning the electronic device to the second power consumption mode comprises at least one of activating a device idle mode, activating sleep mode, turning on a screensaver, and locking the device.

18. The non-transitory computer program product of claim 16, wherein the angle of inclination between the stylus and the stylus detection surface is determined by determining a location of a resonant circuit within the stylus.

* * * * *